United States Patent [19]
Takano

[11] Patent Number: 5,186,488
[45] Date of Patent: Feb. 16, 1993

[54] AIRBAG RESTRAINT SYSTEM

[75] Inventor: Hiroyuki Takano, Kanagawa, Japan

[73] Assignee: Ikeda Bussan Co., Ltd., Ayase, Japan

[21] Appl. No.: 612,455

[22] Filed: Nov. 14, 1990

[30] Foreign Application Priority Data

Nov. 16, 1989 [JP] Japan .................................. 1-297891

[51] Int. Cl.$^5$ .............................................. B60R 21/16
[52] U.S. Cl. .................................... 280/728; 280/743; 2/275
[58] Field of Search ................ 280/743, 728, 738-740; 2/275, 274

[56] References Cited

U.S. PATENT DOCUMENTS

| | | | |
|---|---|---|---|
| 3,527,475 | 9/1970 | Carey et al. | 280/739 |
| 3,573,885 | 4/1971 | Brawn | 280/739 |
| 3,810,654 | 5/1974 | DeBano, Jr. et al. | 280/743 |
| 3,990,726 | 11/1976 | Oka et al. | 280/743 |
| 4,805,930 | 2/1989 | Takada | 280/743 |
| 4,830,401 | 5/1989 | Honda | 280/743 |
| 4,966,389 | 10/1990 | Takada | 280/743 |

FOREIGN PATENT DOCUMENTS

| | | | |
|---|---|---|---|
| 2542764 | 4/1977 | Fed. Rep. of Germany | 280/739 |
| 54-3485 | 2/1979 | Japan . | |
| 56-12139 | 3/1981 | Japan . | |

Primary Examiner—Margaret A. Focarino
Assistant Examiner—Paul Dickson
Attorney, Agent, or Firm—Foley & Lardner

[57] ABSTRACT

An airbag restraint system for an automotive vehicle is comprised of an airbag including a bag-shaped section. The bag-shaped section is formed by sewing a sheet material into a bag-shape, forming a sewed section. The sewed section has a low strength part which is openable under action of an internal pressure of the gas inside the airbag during inflation of the airbag, so that a passenger's head is protected from an impact or reaction from the inflated airbag during a serious vehicle collision. A generally frame-shaped reinforcement patch is fixedly attached on the inside surface of the airbag in such a manner as to expose a major part of the low strength sewed part, thereby defining the low strength sewed part having a predetermined size.

12 Claims, 1 Drawing Sheet

AIRBAG RESTRAINT SYSTEM

BACKGROUND OF THE INVENTION

1. Field of the Invention

This invention relates to improvements in an airbag restraint system for protecting a vehicle passenger in the event of a serious vehicle collision, and more particularly to an airbag which is configurated to be supplied with gas from a gas generator and formed by sewing a sheet material into a bag-shape, forming a sewed section, the sewed section including a low strength part which is adapted to be openable under an internal pressure of the airbag to form a gas leak opening through which gas in the airbag leaks out.

2. Description of the Prior Art

Hitherto a variety of airbag restraint systems for an automotive vehicles or the like have been proposed and put into practical use in order to protect passengers in the event of a serious vehicle collision. It is well known that an airbag of the airbag restraint system is arranged to momentarily inflate under supply of gas from a gas generator in the event of a serious vehicle collision thereby to safely restrain the vehicle passenger, in which a part of gas within the airbag is discharged thereby lightening a reaction against the vehicle passenger. Such an airbag restraint system is disclosed, for example, in Japanese Utility Model Publication Nos. 56-12139 and 54-3485, in which the sewed section of the airbag includes a low strength sewed part which is adapted to be openable during inflation of the airbag thereby to form a gas leak opening through which a part of gas within the airbag leaks.

However, difficulties have been encountered in such a conventional airbag restraint system, in which there is a possibility that the sewed section is unnecessarily largely opened so that the airbag cannot sufficiently inflate. Additionally, a gas discharge pressure at which gas is discharged from the airbag varies in accordance with the size of the formed gas leak opening, and therefore a uniform gas discharge pressure cannot be obtained throughout many products. This lowers the reliability of the product. In view of this, it has been proposed to fix two reinforcement cloths respectively at the opposite end portions of the low strength sewed part. However, a uniform distance is difficult to be obtained between the two reinforcement cloths throughout many products, and consequently the size of the gas leak opening varies depending upon the distance between the two reinforcement cloths thereby making impossible to obtain the uniform gas discharge pressure throughout many products. Furthermore, since the two reinforcement cloths are used, the number of parts increases while making troublesome an assembly operation of the airbag.

SUMMARY OF THE INVENTION

An object of the present invention is to provide an improved airbag restraint system which is arranged to securely prevent a passenger from receiving impact or reaction from an inflated airbag by discharging gas in the airbag in the event of a serious vehicle collision.

Another object of the present invention to provide an improved airbag restraint system including an airbag having a gas leak opening which is uniform throughout many products of the airbag, while reducing the number of constituent parts of the airbag and improving the operation efficiency in assembly of the airbag.

An airbag restraint system of the present invention is comprised of an airbag which is fluidly connected with a gas generator and adapted to inflate upon being supplied with gas from the gas generator. The airbag includes a bag-shaped section which is formed by sewing at least one sheet material into a bag-shape, forming a sewed section. The sewed section includes a high strength sewed part, and a low strength sewed part which is low in sewing strength than the high strength one. The low strength sewed part is adapted to open under an internal pressure of said airbag during inflation of the airbag. Additionally, a reinforcement patch is securely attached to the surface of the bag-shaped section and has a central opening defined by an inner periphery thereof. The reinforcement patch is located so that at least a major part of the low strength sewed part is within a range defined by the inner periphery of the reinforcement patch.

Accordingly, since the reinforcement patch is fixed on the surface of the bag-shaped section in such a manner that the low strength sewed part is exposed in the central opening of the patch, a precise or uniform size of the low strength sewed part can be obtained throughout many products. This can provide a uniform gas discharge pressure of the airbag throughout many products, improving a reliability of operation of the airbag restraint system. Additionally, since only one reinforcement patch is used, the number of the constituent parts of the airbag is reduced while improving an operation efficiency in assembly of the airbag.

DETAILED DESCRIPTION OF THE INVENTION

Figure 1:
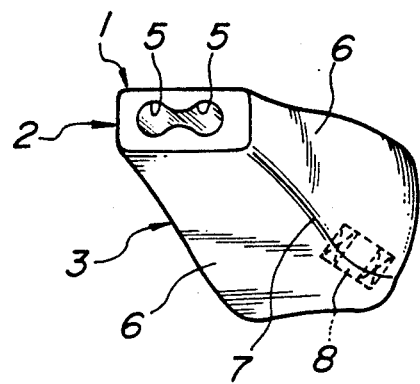
FIG. 1 is a schematic perspective view of an airbag of an embodiment of an airbag restraint system of the present invention.
Figure 2:
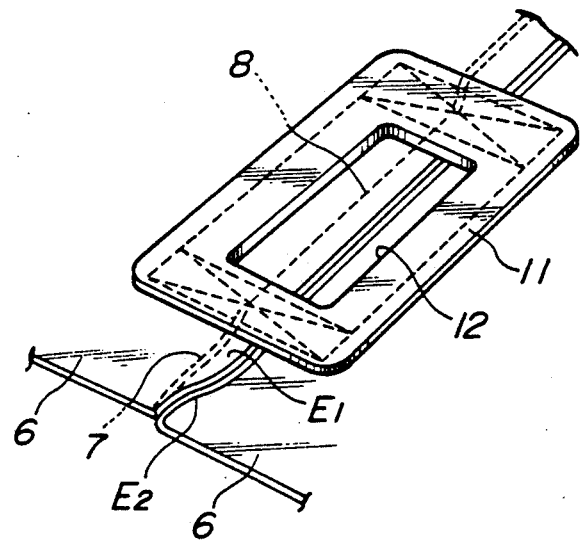
FIG. 2 is a fragmentary enlarged perspective view of an essential part of the airbag of FIG. 1.

Referring now to FIGS. 1 and 2 of the drawing, there is shown an airbag 1 of an embodiment of an airbag restraint system in accordance with the present invention. The airbag restraint system of this embodiment is for an automotive vehicle, so that the airbag 1 is designed to inflate in the event of a serious vehicle collision in order to provide a soft cushion for a vehicle passenger. In this embodiment, the airbag 1 comprises an installation section 2 which is to be securely installed to a base plate (not shown) fixed to an instrument panel or a steering wheel of the vehicle though not shown. A bag-shaped section 2 is fixedly and sealingly connected with the installation section 2. In this embodiment, the bag-shaped section 2 and the installation section 2 are sewed to each other.

The installation section 2 is formed with a pair of gas inlets 5, 5 which are connected with each other. In this embodiment, two gas ejectors (not shown) each having a circular cross-section are disposed respectively in the gas inlets 5, 5. Each gas ejector forms part of a gas generator (not shown) which is adapted to generate gas to be supplied into the bag-shaped section 3 at the vehicle collision. It will be understood that one circular gas inlet may be used in place of the pair of gas inlets 5, 5.

The bag-shaped section 3 is produced by sewing at least one sheet or cloth material 6 to be formed into the bag-shape. The sheet material 6 is formed by coating a synthetic resin sheet on a woven cloth or the like. In this embodiment, the end portions $E_1$, $E_2$ of the sheet material 6 are put one upon another in a manner that the edges of the end portions $E_1$, $E_2$ are arranged parallel as shown in FIG. 2 thereby forming a generally linear sewed section 7. As shown in FIG. 2 a part of the linear sewed section 7 is formed lower in sewing strength than the other parts of the linear sewed section 7 thereby forming a lower sewing strength part 8. In this embodiment, the lower sewing strength part 8 is formed by being sewed with one sewing line whereas the other sewing parts are formed by being sewed with two sewing lines. Otherwise, the lower sewing strength part 8 may be formed by being sewed with low strength threads whereas the other sewing parts are formed by being sewed with high strength threads which are higher in strength than the low strength threads.

A rectangular frame-shaped reinforcement patch 11 is securely attached on the linear sewed section 7 in such a manner that the linear low sewing strength part 8 is located in a rectangular central opening 12 defined by the inner periphery of the frame-shaped patch 11. The reinforcement patch 11 is formed of a woven fabric or a synthetic resin. The length of the rectangular opening 12 is slightly smaller than the length of the low sewing strength part 8. As shown, the reinforcement patch 11 is positioned such that the length of the rectangular opening 12 is parallel with the linear low sewing strength part 8. In this embodiment, each border between the low sewing strength part 8 and the other sewing part (higher in sewing strength than the part 8) is located below and covered with the reinforcement patch 11. In other words, the opposite end portions of the low sewing strength part 8 are covered with the reinforcement patch 11. The reinforcement patch 11 is fixedly secured to the inner or reverse surface of the bag-shaped section 3 of the airbag 1, in which the border between the low sewing strength part 8 and the other sewing part is simultaneously sewed together with the patch 11 with the same threads. The reinforcement patch 11 may be fixedly secured on the surface of the bag-shaped section 3 by so-called high frequency welding or melting.

With the thus arranged airbag 1 of the airbag restraint system of the present invention, the airbag 1 inflates upon being supplied with the gas from the gas generator at a predetermined condition such as a serious vehicle collision, thus restraining a passenger by the airbag 1 to protect her or him from being injured. When the inner pressure reaches a predetermined level, the sewing threads in the low sewing strength part 8 is broken so that the low sewing strength part 8 is opened to form a gas leak opening (not shown) under a condition in which the passenger is restrained by the airbag 1. Thus, gas inside the airbag 1 is discharged to lighten the reaction of the gas force against the passenger. During such a passenger restraining operation, the opposite ends of the low sewing strength part 8 are fixedly fastened by the reinforcement patch 11, and therefore the formed gas leak opening is prevented from being enlarged. As a result, a gas discharge pressure at which the gas inside the airbag 1 is leaked or discharged out is precisely set, so that a plurality of manufactured airbags can have a uniform gas discharge pressure.

What is claimed is:

1. An airbag restraint system comprising:

an airbag fluidly connected with a gas generator and adopted to inflate upon being supplied with gas from the gas generator, said airbag including a bag-shaped section which is formed by sewing at least one sheet material having two end portions, into a bag-shape to form a sewed section, said sewed section elongating generally linearly and including a first sewed part and a second sewed part which is lower in sewing strength than said first sewed part, said second sewed part being openable under an internal pressure of the airbag to discharge the gas inside the airbag during inflation of the airbag; and a reinforcement patch securely attached to the surface of said bag-shaped section and having a central opening defined by an inner periphery thereof, said reinforcement patch being located so that at last a major part of said second sewed part is within a range defined by the inner periphery of said reinforcement patch, said reinforcement patch being in a generally rectangular frame-shape and elongated along said linearly elongating sewed section, said reinforcement patch covering opposite end portions of said second sewed part to fix the opposite end portions, said reinforcement patch including first and second generally rectangular sections which are parallel with each other and spaced from each other to define said central opening therebetween, said first and second generally rectangular sections extending generally perpendicular to said linearly elongating sewed section and located respectively on the opposite end portions of said second sewed part, and third and fourth generally rectangular sections which are parallel with each other and spaced from each other to define said central opening therebetween, each of said third and fourth generally rectangular sections extending generally parallel with said linearly elongating sewed section and integral with said first and second generally rectangular sections.

2. An airbag restraint system as claimed in claim 1, wherein said sewed section is formed on an inside surface of said bag-shaped section, in which said reinforcement patch is disposed on the inside surface of said bag-shaped section.

3. An airbag restraint system as claimed in claim 1, wherein said reinforcement patch is sewed on said sewed section.

4. An airbag restraint system as claimed in claim 1, wherein said sewed section is formed by placing the two end portions of the sheet material one upon the other, and by sewing them together.

5. An airbag restraint system as claimed in claim 1, wherein said first sewed part is sewed with two sewing lines, and said second sewed part is sewed with one sewing line.

6. An airbag restraint system as claimed in claim 1, wherein said first sewed part is sewed with a first thread, and said second sewed part is sewed with a second thread which is lower in strength than said first thread.

7. An airbag restraint system as claimed in claim 1, wherein said sheet material comprises a woven cloth coated with a synthetic resin.

8. An airbag restraint system as claimed in claim 1, wherein said reinforcement patch comprises woven fabric or a synthetic resin.

9. An airbag restraint system as claimed in claim 1, wherein said reinforcement patch is attached to the surface of said bag-shaped section by one of high-frequency welding and melting.

10. An airbag restraint system as claimed in claim 1, wherein only one reinforcement patch is secured to the surface of said bag-shaped section.

11. An airbag restraint system as claimed in claim 1, wherein said first and second generally rectangular sections are sewed on the surface of said bag-shaped section respectively with first and second sewed portions each of which extend to generally traverse said linearly elongating sewed section.

12. An airbag restraint system as claimed in claim 11 wherein said third and fourth generally rectangular sections are sewed on the surface of said bag-shaped section respectively with third and fourth sewed portions each of which extend generally parallel with said linearly elongating sewed section.

* * * * *